Oct. 9, 1962 B. I. BERTELSEN ETAL 3,058,112

MAGNETIC RECORDING

Filed Dec. 31, 1958 4 Sheets-Sheet 1

INVENTORS.
BRUCE I. BERTELSEN
HERBERT J. KUMP

BY William N. Barret Jr.

ATTORNEY

Oct. 9, 1962

B. I. BERTELSEN ETAL 3,058,112

MAGNETIC RECORDING

Filed Dec. 31, 1958

4 Sheets-Sheet 4

3,058,112

MAGNETIC RECORDING

Bruce I. Bertelsen, Vestal, and Herbert J. Kump, Endicott, N.Y., assignors to International Business Machines Corporation, New York, N.Y., a corporation of New York Filed Dec. 31, 1953, Ser. No. 784,382
4 Claims. (Cl. 346—74)

The present invention relates to a new method for recording discrete or digital information on a record material. In particular, the present invention relates to a method of recording information on a magnetizable material.

Digital or discrete recording is that method of recording which uses predetermined levels of magnetization in a magnetizable medium as an indication of a limited set of values. In an ordinary sense, the presence of one level of magnetization would indicate a mark or perhaps a binary "1" while a different level would indicate a space or perhaps a binary "0." By suitable coded combinations of marks and spaces, different characters will be indicated. At the present time, digital or discrete recording is widely used as a method of storing information for use in calculators or computing machinery in various storage elements such as magnetic tapes and magnetic drums.

In the operation of this machinery, these records are searched for information when necessary. For the magnetic drum, the information search is conducted by cyclically presenting each digit of information at a fixed point adjacent the periphery of the drum by revolving the drum about its axis. In the case of tapes, the tape is moved from one reel to another through a sensing station where the information contained on the tape is sensed. The access time, which is the time to go to a particular location, is fairly short for the drum and may be quite long for the tape if the information is at the opposite end of the tape. Insofar as quantity of information is concerned, the drum is limited by mechanical considerations while the tape, although not quite so limited, has a problem insofar as increasing tape length is concerned in that the access time may be increased. Parallel operation of magnetic media can be accomplished but here there is a duplication of equipment and a corresponding increase in cost per bit of storage.

With this general situation, the present objectives have been to increase the density of recording of magnetic media to reduce the cost per bit of storage location by storing more information in a given area and also to effect a reduction in access time for given datum and thus to reduce the time for operation of a particular routine. This, in the economics of computer operation, is also a savings in cost.

The present invention provides a method of recording in which a discrete bit is formed by recording an area and then erasing a predetermined portion of the recorded area. By this method of recording, the bit size of the recorded information may be made as small as desired without dependence upon the geometry of the head.

As a more particular method of the invention, an area of magnetizing force is applied to a magnetizable medium to magnetize it in a first direction; subsequently, a like area of magnetizing force is applied to the medium to magnetize it in a second direction. By varying the area of magnetizing force, an incremental area magnetized in the first direction may be retained as the recorded information.

As another more particular method of the invention, an area of magnetizing force is applied to a magnetizable material in a first direction; subsequently, a like area of magnetizing force is applied to the medium to magnetize it in a second direction. By shifting the magnetizing force used to magnetize the medium in a second direction, a small portion of the magnetization in the first direction may be retained as the recorded information.

An ancillary advantage of this type of recording which also contributes to the predominant advantage of bit density unlimited by writing head dimensions is the ability to provide sharper switching pulses. In a system of coding using opposite saturations of the magnetic medium to indicate either a binary zero or a binary one, which is spoken of as discrete non-return to zero and indicates that the magnetization is in one sense or the other at all times, the problem inherent in switching is the delay caused by the collapsing field and opposing current generated which tends to oppose the collapse along with the inductive delay in building up the magnetic flux to a sufficient field for saturation in the opposite direction. In the present method, the response time of recording is decreased so that there is substantially no delay in recording either a binary one or a binary zero by saturation of the medium in opposite directions.

In the method of recording of the present invention it is necessary that the characteristics of the magnetizable medium and the recording head complement each other to provide that any desired area of recordation can be completely erased. In the illustrations of the present invention, recording heads are illustrated having omnidirectional magnetizing characteristics, while the magnetizable medium is bidirectional. With this arrangement wherein the recording head can effect magnetization in all planar directions, it is necessary that the erasing be selectively controlled in the same manner as the recording or a bidirectional record medium used so that there are only selected components of the field of the recording head which are effective to switch the magnetization of the record. This is in effect a virtual bidirectional recording head. It is of course within the scope of this invention to have an actual bidirectional recording head with an omnidirectional recording medium to accomplish the same result.

As mentioned previously, the apparatus illustrating the present invention utilizes a bidirectional magnetizable medium. One bidirectional magnetizable medium is formed of a nickel-cobalt alloy of a thickness of approximately 2000 A. which will provide magnetization almost totally in the longitudinal direction within the plane of the medium. This characteristic is desirable in using a single pole recording head which generates a large component of flux in the perpendicular direction. By using a thin film magnetizable medium, there will be almost no perpendicular magnetization and consequently a much more definitive recording. For material substantially thicker, for example, .0006", the magnetization is still believed to be substantially longitudinal. The thickness of the material, while providing the above-mentioned characteristic for the omnidirectional single pole recording head utilized, is not essential since the recording is established by the longitudinal flux lines and the use of a magnetizable medium of substantial thickness, e.g., .001" magnetic tape, which would be magnetized in the perpendicular direction by the perpendicular lines of flux from a single pole head would also have some longitudinal magnetization away from the center portion of the head.

In speaking of perpendicular and longitudinal magnetization, it is to be understood that this refers to the domain orientation after being subjected to magnetic flux from a recording head having components in the various directions. In the theory of magnetization as presently understood, the magnetizable material contains magnetic domains which are randomly oriented in a non-magnetized material. These domains which are oriented in both the perpendicular and longitudinal direction will produce a magnetic flux external to the material dependent in magnitude upon the extent and orientation of the domains in the material. During magnetization, by passing a high flux density through the magnetizable material in a predetermined direction, the domains influenced thereby are expanded and oriented to form an area which is different from those adjacent thereto if they are unmagnetized or magnetized to a lesser or greater degree.

To illustrate the invention, a further form of recording apparatus is shown in which the magnetizable material is not magnetized in the perpendicular direction regardless of the thickness of the material.

In the preliminary outline of the invention, there have been pointed out various criteria for practicing the present invention which can be summed up in the following:

(1) The magnetizable material is first magnetized in a predetermined area and then a predetermined area is selectively erased.

(2) The magnetizing and erasing is either longitudinal or perpendicular even if there are substantial components of magnetization in the opposite direction.

(3) The recording head and magnetizable medium must complement each other so that if the head has an omnidirectional flux pattern the medium will be anisotropic which will provide a virtual bidirectional recording head; an actual bidirectional recording head and omnidirectional medium is also usable.

For reading the information stored by the method of the present invention, the apparatus used will depend upon the manner in which the material was magnetized. For one form of recording here shown, the only magnetization is caused by the information stored so that this can be read conventionally. The signal strength will of course depend upon the thickness of the material and many other parameters. In any event, variations in longitudinal magnetization can be detected optically by the "Longitudinal Kerr Effect." For thicker films using some of the present apparatus, there would perhaps be perpendicular magnetization also so that a noise factor would necessarily have to be dealt with. For other variations in recording by variations in longitudinal area or by perpendicular magnetization, the reading may be done conventionally or special apparatus may be needed.

It is therefore an object of this invention to provide a novel method for recording information.

Another object of this invention is to provide a method of recording information on a magnetic material so that the size of the recorded mark is substantially independent of the structure used for recording.

A further object of this invention is to provide a method of recording information on a magnetic material so that the size of the recorded mark is substantially dependent only upon the time duration of the information to be recorded.

Another and further object of the present invention is to provide a method of recording information on a magnetizable material in which an indication is first recorded and then partially erased to leave the indication as the unerased portion.

Still another object of the present invention is to provide a method of recording in which the magnetization of a medium may be reversed without substantial delay caused by the inductive load.

Yet another object of the present invention is to provide a method of recording in which there is no necessity of reversing the current to magnetize a magnetizable medium in a different direction.

Other objects of the invention will be pointed out in the following description and claims and illustrated in the accompanying drawings, which disclose, by way of example, the principle of the invention and the best mode which has been contemplated of applying that principle.

Figure 2:
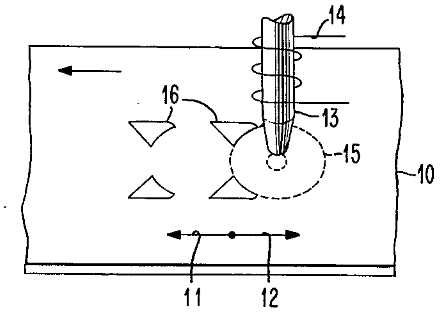
FIG. 2 is a schematic illustration of an apparatus for practicing the present invention.

The magnetizable material illustrated in the present invention is given the property of bidirectional or anisotropic magnetic stability so that in a medium 10, such as shown in FIG. 2, there will be only two directions of longitudinal magnetization shown by magnetization vectors 11 and 12. This is accomplished by a variety of methods known to the art, such as:

(1) vacuum deposition of the magnetizable material in a magnetic field;

(2) application of stress after deposition on the magnetizable material in a magnetic field.

The orientation of the magnetization in the material 10, FIG. 2, determines the significance of what has been recorded. In this example, the magnetization 11 represents a binary zero or space and magnetization 12 represents a binary one or mark. This convention is decided in accordance with the polarity of the recording head and the direction of movement of the magnetizable medium as will be illustrated subsequently. In FIG. 2, the magnetizable material 10 for the purpose of illustration would have a magnetization 11 as it passed into the area of influence 15 of recording head 13 to indicate zero and would have a magnetization 11 after leaving the recording head 13 except in those places 16 where a binary one is to be recorded.

Figure 1:
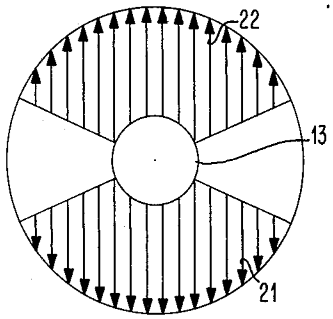
FIG. 1 is a plan view of a magnetic recording head and its effective magnetic flux pattern.

The recording head being a single magnetic pole has a magnetic flux pattern which proceeds from the north pole to the south pole in a substantially uniform pattern. However, since the magnetizable medium has a bidirectional stability and magnetization cannot exist in any other direction, all those components of flux from head 13 at less than some acute angle from the perpendicular of said vector 11 or 12 will be ineffective to reverse the magnetization of the magnetizable medium. This is because the longitudinal component of magnetic flux at certain angles is insufficient to switch the magnetization in the medium from one direction to the other. In FIG. 1, the showing is of only the longitudinal directional flux since in these areas the direction of magnetization will be switched.

With the flux from recording head as shown in FIG. 1, it is seen that the magnetizable material 10 as it enters into the effective area 15 of recording head 13, FIG. 2, will be reversed from magnetization 11 to magnetization 12 prior to reaching the center of the head and reverse again on the other side of the head. Recording such as 16 is effected by not reversing the magnetization 12. This is one of the broad features of applicants' invention. The flux pattern, FIG. 1, of head 13 does not show any flux component in the area of the head since at this point the flux is substantially perpendicular and only the longitudinal component of flux has been shown.

Figure 3:
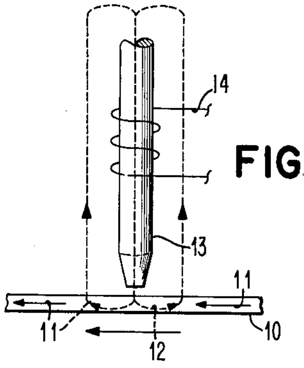
FIG. 3 is another view of the apparatus shown in FIG. 2.

In FIG. 3, a cross-sectional view of the recording head 13 and magnetizable material 10 illustrates the longitudinal direction of the flux from the head 13 and graphically the change in magnetization 11 to magnetization 12 and again to magnetization 11. In this figure, the material 10 is shown as one having predominantly longitudinal magnetization as discussed previously. Here the recording head 13 has the north pole oriented adjacent the recording medium 10. This is course may be reversed to have the south pole adjacent the medium.

In the schematic illustration of FIGS. 2 and 3, the recording head is either a permanent magnet having a coil or a material of high permeability having a coil. The operation of the recording head when using a permanent magnet is to wind the coil 14 in such a manner so that a current pulse properly oriented with respect to the terminals will create a magnetic field which opposes to some extent the field produced by the permanent magnet. For a recording head which is not a permanent magnet, the coil 14 would carry a current sufficient to produce the magnetization 11 specified previously while to record the current in coil 14 would be reduced.

Another operation of the recording head which can be used is to increase the magnetic field produced by the coil by increasing the current in the proper direction so that the area of magnetization may be increased. It is also obvious that a similar result could be achieved by opposing the flux of the permanent magnet head continuously by a current carrying coil and relaxing the current when it is desired to record.

The method of magnetization to record bits such as 16, FIG. 2, is shown in FIGS. 4–7 which illustrates a portion of magnetizable material at successive increments of time during which time a recording pulse is applied to head 13 to reduce the effective area of the magnetic flux produced by the head.

Figure 4:
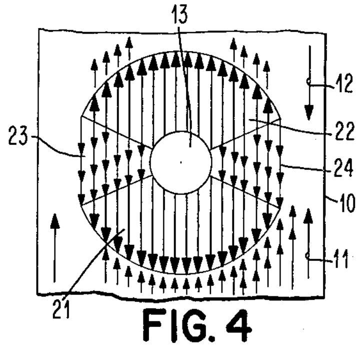
FIGS. 4–7 are schematic illustrations to show the method of the present invention.

The magnetization of medium 10, when there is no recording, is shown in FIG. 4 by the vector 11 and the series of smaller vectors pointed in the same direction both in front and behind the area of influence of head 13. The effective regions of flux 21 and 22 from head 13 reverse the magnetization of medium 10 as described in reference to FIG. 2. Between these effective flux regions, the magnetization in those areas of the medium 23 and 24 corresponds to the magnetization 12.

Figure 5:
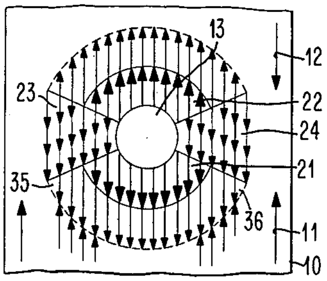
Figure 6:
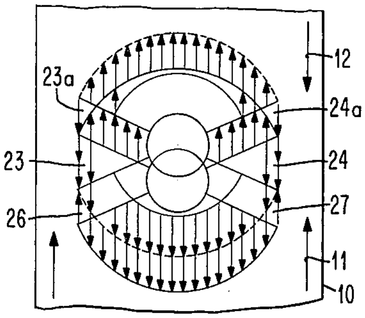

By applying a pulse to coil 14 to reduce the area of influence of a permanent magnet head 13 or reducing the current through the coil 14 in a non-permanent magnet head, the area of influence of head 13 is as shown in FIG. 5. When the pulse of current is terminated and the area of influence from head 13 increases to its original size, the picture of the magnetizable material is as shown in FIG. 6 with the prior activity shown dotted with the present condition shown in full. It can be seen that areas 23 and 24 with magnetization 12 have peripheral sections **23*a* and 24*a* which begin to pass from beneath the effective area of head 13 as the regions 22 and 21 are reduced. The size of the peripheral section 23*a* and 24*a* which passes beyond the region 22 is dependent solely on the duration of the pulse. By making the pulse short enough, the size of the bit may be reduced to as small an area as can be read. While an area 23*a* and 24*a* is created, areas 26 and 27 having a magnetization 11 are created. Since in an actual apparatus the recording would take place in a predetermined digit location, there will necessarily be spaces between each digit location for the areas 26 and 27**.

If the area of influence of magnetic head is increased by any of the operations described previously it can be seen from FIG. 4, that the effect will be to increase the peripheral extent of both areas 21 and 22. As area 21 grows larger, there will be a magnetization 12 at the opposite corners of area 21 which will not be erased by area 22 if the effective area from head 13 is decreased to its original size before the increased area of magnetization 12 reaches area 22. Area 22 will of course erase all that area except the portion caused by the pulse. The bit size here is also dependent solely upon the pulse width and the repetition rate or frequency is not limited except by the size of the bit. One of the two bits written could be erased or ignored.

In the preceding description of the flux patterns of head 13 and the resulting magnetization of medium 10, it is of course obvious that the illustrations are highly idealized from the precise patterns which would be found in practice. The effective areas of flux from head 13 as shown are not intended to be limitations since the precise areas 23 and 24 are not critical in the practice of the invention.

Figure 8:
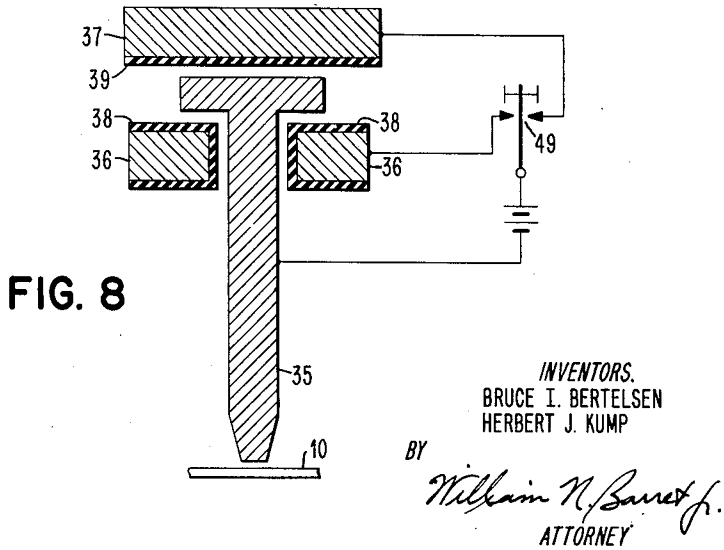
FIG. 8 is a schematic illustration of another apparatus for practicing the present invention.

Apparatus for reducing or increasing the effective field of a recording magnet 35 is shown in FIG. 8. The recording magnet 35 is shown as a permanent magnet which could also be an electromagnet which is moved perpendicularly with respect to medium 10. The recording head can be operated electrostatically by closing a switch 49, shown as mechanical but which could or would be electronic, to one or the other of the terminals so that potential is applied between the magnet 35 and the conductors 36 and 37 separated by insulators 38 and 39. When the switch is closed, potentials of opposite polarity are connected to the stationary conductors 36 or 37 and the movable recording head 35 and the parts with opposite potentials applied thereto are attracted to one another to cause mechanical movement of the head 35. The apparatus is shown more or less schematically since the particulars of construction form no part of the present invention. The electrostatic recording head is of course illustrative of an apparatus in which the recording magnet is moved from the position adjacent the magnetizable medium to a position more remote or vice versa to accomplish the same operations as described in relation to the preceding apparatus.

Figure 9:
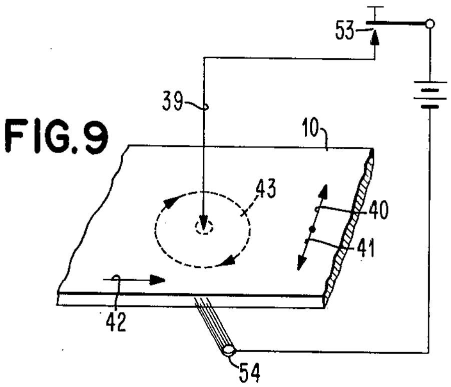
FIG. 9 is a schematic illustration of a further apparatus for practicing the present invention.
Figure 10:
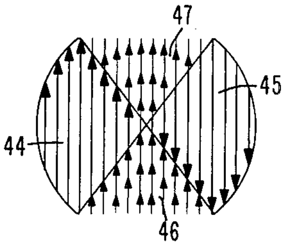
FIG. 10 is an illustration of the flux pattern of the apparatus shown in FIG. 9.
Figure 7:
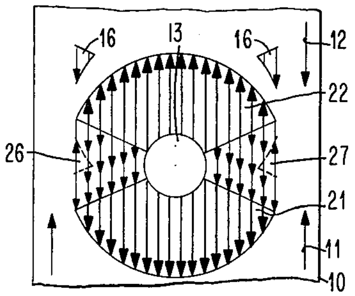

In the apparatus shown in FIG. 9, a magnetizable material is moved in the direction shown by arrow 42 beneath a current carrying wire 39 which completes its return path through the magnetizable material to a brush 54. The wire 39 may be in contact with medium or complete the circuit by an arc. The current at the point of contact with the medium creates a magnetic flux pattern as shown at 43. In this magnetizable material as in that medium shown in prior figures, there is a bidirectional magnetization shown as either magnetization 40 or 41, FIG. 9. The circular area of magnetic flux 43 contains components in each direction effective to switch the magnetization from 40 to 41 and vice versa. The effective components are shown in FIG. 10 as 44 and 45 with the areas 46 and 47 representing the medium which is first switched by area 44. If no current pulse is applied to raise or lower the area of influence 43, the areas 46 and 47 will be reset by area 45 to magnetization 46. When the current in wire 39 is raised or lowered, a result such as discussed with regard to previous apparatus will occur.

Figure 11:
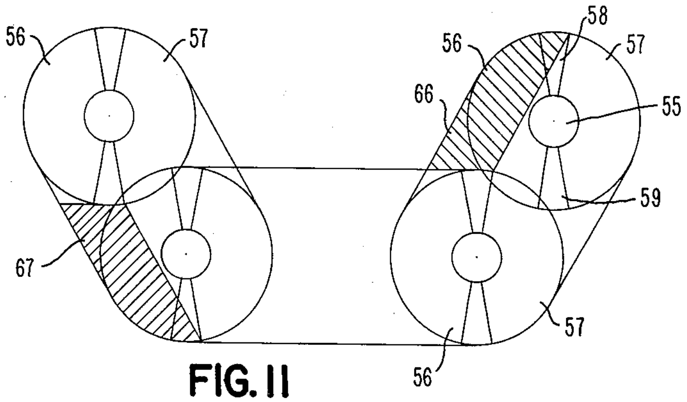
FIGS. 11–13 are further illustrations to show the method of the present invention.
Figure 12:
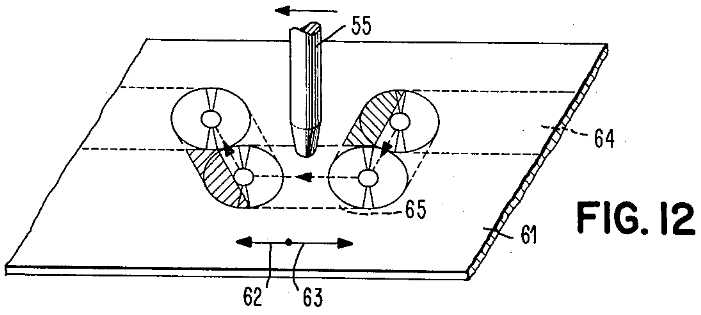
Figure 13:
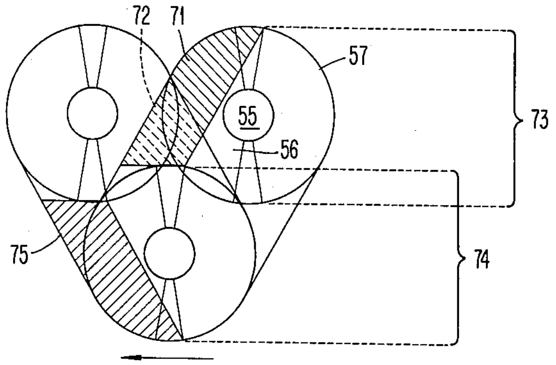

In the particular method of FIGS. 11–13, the permanent magnet or electromagnet is moved a fraction of an inch to record and erase a fraction of the recording in a manner similar to that discussed previously.

In FIGS. 11 and 12, the recording head 55 is shown movable but the recording medium 61 could just as well be movable, since it is relative. Here, too, the magnetizable material 61 is bidirectionally magnetizable, and the recording head omnidirectionally magnetizing to produce a flux path as shown in FIG. 1.

With a flux pattern, as shown in FIG. 1, the recording head 55, FIG. 11, will have an area 56 for creating a magnetization 62 and an area 57 for creating a magnetization 63. When moving the head 55 in a single track along the magnetizable medium, the area 56 will magnetize in one direction while the area 57 will magnetize in the other direction. If the head 55 is moved laterally, a pattern of magnetization 66 is created which will not be erased by area 57, since area 57 does not pass across magnetization 66. The area of magnetization 66 is created by the action of area 56 which magnetizes in direction 62 modified by the erasing action of area 57. The sector created by the recording is that portion which is not erased due to the lateral movement of the recording head. It is apparent that the angle formed with the perpendicular is a function of the relative speed of record medium and record head. With a faster movement of the record head in a lateral direction, the angle will be smaller.

As also shown in FIGS. 11 and 12, the recording head will move back from track 65 to 64 and in so doing will leave a similar type of recording to that described previously. The important feature to note here is that in return to track 64 the area 57, which it will be remembered is the erase section, will make a diagonal track back across the recording track 64.

The illustration in FIG. 13 shows the formation of a recorded bit of information which is in size dependent only upon pulse size and not upon the geometry of the recording head. The recorded bit is a function of the angle between a perpendicular excursion and the actual resulting movement caused by the relative movement of recording head and record medium, the amplitude of movement and the return angle of the head. When the head returns, the area 57 partially erases the record area to leave an area 71 as the recorded bit. The erased portion is shown in broken lines as area 72. The recorded bit 75 would be erased by a suitable head, not shown, or ignored.

The patterns of magnetization and demagnetization of FIG. 13 are shown in exaggerated dimensions. It is to be realized that the movement of record head 55 laterally would be quite small and the angles formed quite near to the perpendicular so that the recorded area 71 could be small as desired.

Suitable apparatus for achieving the rapid excursions desirable for this type of recording are shown in FIGS. 14–15 and FIGS. 16–17. As it will be realized, these are mere illustrative types of apparatus to perform the method since many other types could be utilized.

Figure 14:
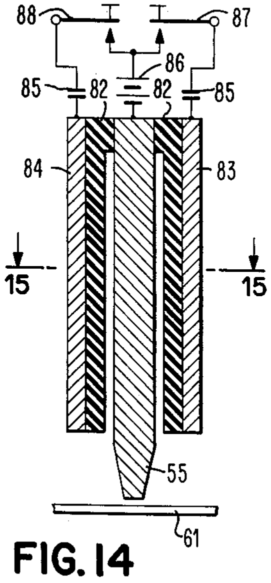
FIG. 14 is a schematic illustration of an apparatus for practicing the present invention.
Figure 15:
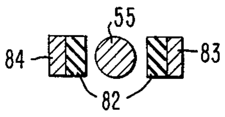
FIG. 15 is a cross section of the apparatus shown in FIG. 14 taken on line 15—15.

The apparatus shown in FIGS. 14 and 15 is illustrative in principle. The recording head 55 is connected to one terminal of a battery 86 while two conducting pieces 83 and 84 are connected by condensers 85 to switches 87 and 88. A dielectric 82 separates the conductors 83, 84 and head 55. When a switch is closed, the battery voltage is instantaneously applied across the capacitor 85 and an electrostatic force is achieved to move the magnet 55 in the proper direction. This is a similar action to that described with reference to FIG. 8. While the switches 87 and 88 are shown as mechanical, it is obvious that they will be electronic or solid state devices to achieve a fast responsive time.

Figure 16:
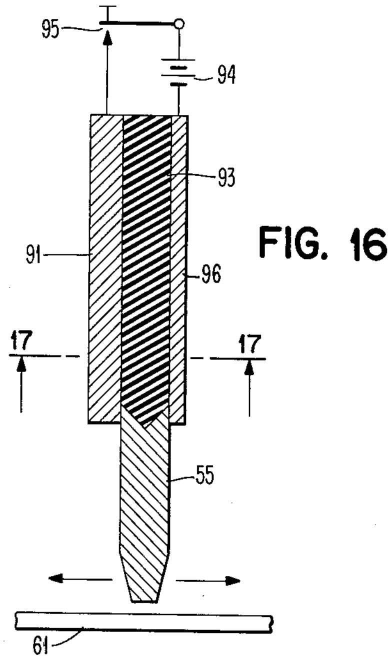
FIG. 16 is a schematic illustration of an apparatus for practicing the present invention.
Figure 17:
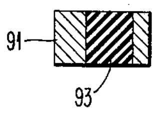
FIG. 17 is a cross section of the apparatus shown in FIG. 16 taken on line 17—17.

The apparatus of FIGS. 16 and 17 is electrostrictive with a conducting outer piece 91 and 96, and an inner piece 93 of $BaTiO_3$. When potential is applied to the two outer inductors 91 and 96, the inner rectangular rod 93 of $BaTiO_3$ has its volume changed. The thin conductor 96 will move with the piece 93 and the recording head 55 will be flexed to record in a manner similar to that described in relation to FIG. 14. When the switch is released, the head 55 is returned to its undeformed position.

One of the objects of the present invention was to increase the switching time of the change from a magnetization of one direction to a magnetization in another direction, and it can be seen that the method does render this possible. One of the two particular methods, a simple change in current, is all that is necessary to change the actual area and change the position of the area. In the ordinary type of ring recording head, it is necessary that saturation currents in opposite directions be utilized for the same methods of recording or at the very least large variations in current to achieve large variations in inductance be utilized.

Restating the invention in its broad items, it can be seen that applicants have provided a method which involves recording a bit size of predetermined area and erasing all but the desired portion. This is accomplished in two ways; first, by varying the area of recording which is accomplished by changing the diameter of the recording area of the recording head for a predetermined time determined by the relative velocity of magnetizable medium and recording head, and second, by moving the area itself for a predetermined time determined by the relative velocity of the magnetizable medium and recording head.

Besides the advantage of extremely high bit density, the method of recording a variation in current or an applied voltage decreases the time for switching since there is no need for a large change in current through an inductance as in the ordinary case. The recording through a simple current variation also allows simpler driving circuitry since no reversal in current is needed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A method of digital magnetic recording on a magnetizable medium which comprises establishing a first magnetic field in said magnetizable medium having a force sufficient to set a first incremental area of said medium in a first stable state of magnetization, establishing a second magnetic field in said magnetizable medium having a force sufficient to set an incremental area of said medium equal to said first incremental area in a second stable state of magnetization opposite to said first state, substantially positioning said second magnetic field coextensively with said first incremental area, and varying the relative strength of said magnetic fields in relation to said first incremental area whereby portions of said first incremental area remain in said first stable state as discrete magnetizations in said medium.

2. A method of digital magnetic recording on a magnetizable medium which comprises establishing a first magnetic field in said magnetizable medium having a force sufficient to set a first incremental area of said medium in a first stable state of magnetization, establishing a second magnetic field in said magnetizable medium having a force sufficient to set an incremental area of said medium equal to said first incremental area in a second stable state of magnetization opposite to said first state, substantially positioning said second magnetic field coextensively with said first incremental area, and increasing the strength of said first magnetic field relative to said second magnetic field whereby said first incremental area will be greater in area than an incremental area formed by said second field so that portions of said first incremental area will remain in said first stable state as discrete magnetizations in said medium.

3. A method of digital magnetic recording on a magnetizable medium which comprises establishing a first magnetic field in said magnetizable medium having a force sufficient to set a first incremental area of said medium in a first stable state of magnetization, establishing a second magnetic field in said magnetizable medium having a force sufficient to set an incremental area of said medium equal to said first incremental area in a second stable state of magnetization opposite to said first state, substantially positioning said second magnetic field coextensively with said first incremental area, and decreasing the strength of said second magnetic field relative to said second magnetic field whereby an incremental area formed by said second field will be less in area than said first incremental area so that portions of said first incremental area will remain in said first stable state as discrete magnetizations in said medium.

4. The method of claim 1 wherein said step of varying the relative strength of said magnetic fields in relation to said first incremental area includes the step of displacing said second magnetic field momentarily such that the second magnetic field is not coextensive with said first incremental area.

References Cited in the file of this patent

UNITED STATES PATENTS

| | | |
|---|---|---|
| 2,610,257 | Wissmann | Sept. 9, 1952 |
| 2,743,320 | Daniels et al. | Apr. 24, 1956 |
| 2,894,796 | Reynolds | July 14, 1959 |

FOREIGN PATENTS

| | | |
|---|---|---|
| 552,290 | Italy | Nov. 30, 1956 |
| 769,727 | Great Britain | Mar. 13, 1957 |